US012557794B1

(12) United States Patent
Hunter

(10) Patent No.: US 12,557,794 B1
(45) Date of Patent: Feb. 24, 2026

(54) AUTOMATED FROZEN FISH FOOD FEEDER AND AUTOMATED CLEANING SYSTEM

(71) Applicant: Erik Hunter, Santee, CA (US)

(72) Inventor: Erik Hunter, Santee, CA (US)

( * ) Notice: Subject to any disclaimer, the term of this patent is extended or adjusted under 35 U.S.C. 154(b) by 0 days.

(21) Appl. No.: 18/758,746

(22) Filed: Jun. 28, 2024

Related U.S. Application Data

(60) Provisional application No. 63/524,223, filed on Jun. 30, 2023.

(51) Int. Cl.
 *A01K 61/85* (2017.01)
(52) U.S. Cl.
 CPC ................................... *A01K 61/85* (2017.01)
(58) Field of Classification Search
 CPC ...................................................... A01K 61/85
 See application file for complete search history.

(56) References Cited

U.S. PATENT DOCUMENTS

| | | | | |
|---|---|---|---|---|
| 2,858,799 A | * | 11/1958 | Krauss | A01K 61/85 |
| | | | | 222/170 |
| 5,138,979 A | * | 8/1992 | Baird | A01K 61/80 |
| | | | | 119/51.04 |
| 5,709,166 A | * | 1/1998 | Evans | A01K 5/02 |
| | | | | 119/51.11 |
| 5,782,204 A | * | 7/1998 | Rahn | A01K 63/006 |
| | | | | 4/491 |
| 6,009,835 A | * | 1/2000 | Boschert | A01K 61/85 |
| | | | | 222/650 |
| 11,895,990 B1 | * | 2/2024 | Johnson | A01K 61/85 |
| 2009/0255474 A1 | * | 10/2009 | Gleesing | A01K 61/85 |
| | | | | 119/51.11 |
| 2015/0208619 A1 | * | 7/2015 | Noble | A01K 61/85 |
| | | | | 119/51.04 |
| 2022/0240491 A1 | * | 8/2022 | Hunter | F25D 19/00 |
| 2023/0135266 A1 | * | 5/2023 | Cox, Jr. | A01K 63/047 |
| | | | | 119/245 |

FOREIGN PATENT DOCUMENTS

WO WO-2022197643 A1 * 9/2022

OTHER PUBLICATIONS

Translation of ES1241870U (Year: 2020).*

* cited by examiner

*Primary Examiner* — Monica L Perry
*Assistant Examiner* — Brittany A Lowery
(74) *Attorney, Agent, or Firm* — Plager Schack LLP; Mark H. Plager; Alexis Saenz

(57) ABSTRACT

An automated frozen fish food feeder system includes a programmable board, reservoir for holding food, and a cooling system to preserve the frozen fish food until ready for dispensing. A pump circulates food from the reservoir into an aquarium or other holding tank when the programmed time and interval for dispensing is reached. When the food dispensing process is done, the pump may be operated to purge food lines of any foodstuff remaining in the lines.

16 Claims, 7 Drawing Sheets

AUTOMATED FROZEN FISH FOOD FEEDER AND AUTOMATED CLEANING SYSTEM

CROSS-REFERENCE TO RELATED APPLICATIONS

This application claims benefit under 35 U.S.C. § 119(e) of U.S. Provisional Application having Ser. No. 63/524,223 filed Jun. 30, 2023, which is hereby incorporated by reference herein in its entirety.

BACKGROUND

The embodiments herein relate generally to pet accessories and more particularly, to an automated frozen fish food feeder.

Currently, devices that automate the feeding of frozen fish food into hobbyist aquariums, breeding facilities and educational institutions require a lot of manual maintenance. Circumstances occasionally prevent keepers of aquatic life from physically being present to manually maintain feeding systems.

As can be seen there is a need for a device and method that automates the frozen fish food feeding process and maintains the upkeep of such systems for the health of the animals being cared for.

SUMMARY

In one aspect, a system for automated dispensing of fish food into an aquatic holding tank and purging of lines is disclosed. The system includes a reservoir for holding the fish food until a time for feeding is reached. A food line connects the reservoir to the aquatic holding tank. A pump system is connected between the reservoir and the aquatic holding tank and is configured to move the fish food from the reservoir to the aquatic holding tank. A cooling system is coupled to the reservoir and disposed to cool the fish food. A controller module is connected to the pump system and to the cooling system. The controller module is programmed to control: a temperature of the cooling system that maintains the fish food in a frozen state while in the reservoir, operation of the pump system to move fish food from the reservoir to the aquatic holding tank through the food line according to a programmed time schedule and interval of feeding, and operation of the pump to purge food from the food line connected to the reservoir.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology provide a system for automated feeding of aquatic animals with a self-maintenance function. Frozen food may be more of a challenge to handle and clean out than conventional dry food because large portions of the frozen food may thaw prematurely before it is dispensed (the food is kept in slurry form, at a user selectable temperature between 5° C. and −1° C., the ideal temperature being just below 0° C. (for example, −1.8° C.)). The thawed food can easily accumulate or get stuck in the delivery system. The food substance may spoil if thawed too soon which may cause the aquatic life to become sick. Food particles that remain in the delivery path may gather bacteria or spoil which may contaminate new loads of food being dispensed. As will be appreciated, aspects of the subject technology control the automated dispensing of frozen food so that the food is maintained fresh enough to feed before spoiling. In addition, the foodstuff in the delivery channels of the system is cleaned out by automated devices to ensure that the food delivered is safe for consumption.

Figure 1:
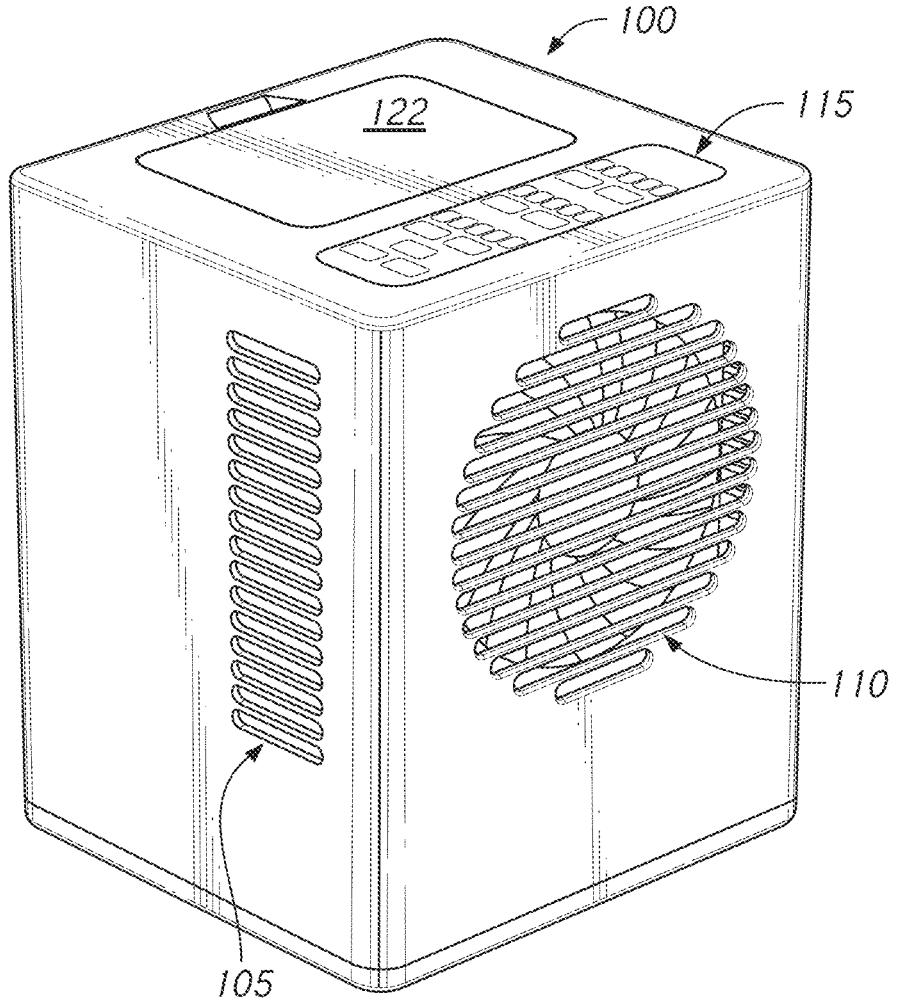
FIG. 1 is a perspective view of an automated frozen food feeding system according to embodiments of the subject technology.
Figure 2:
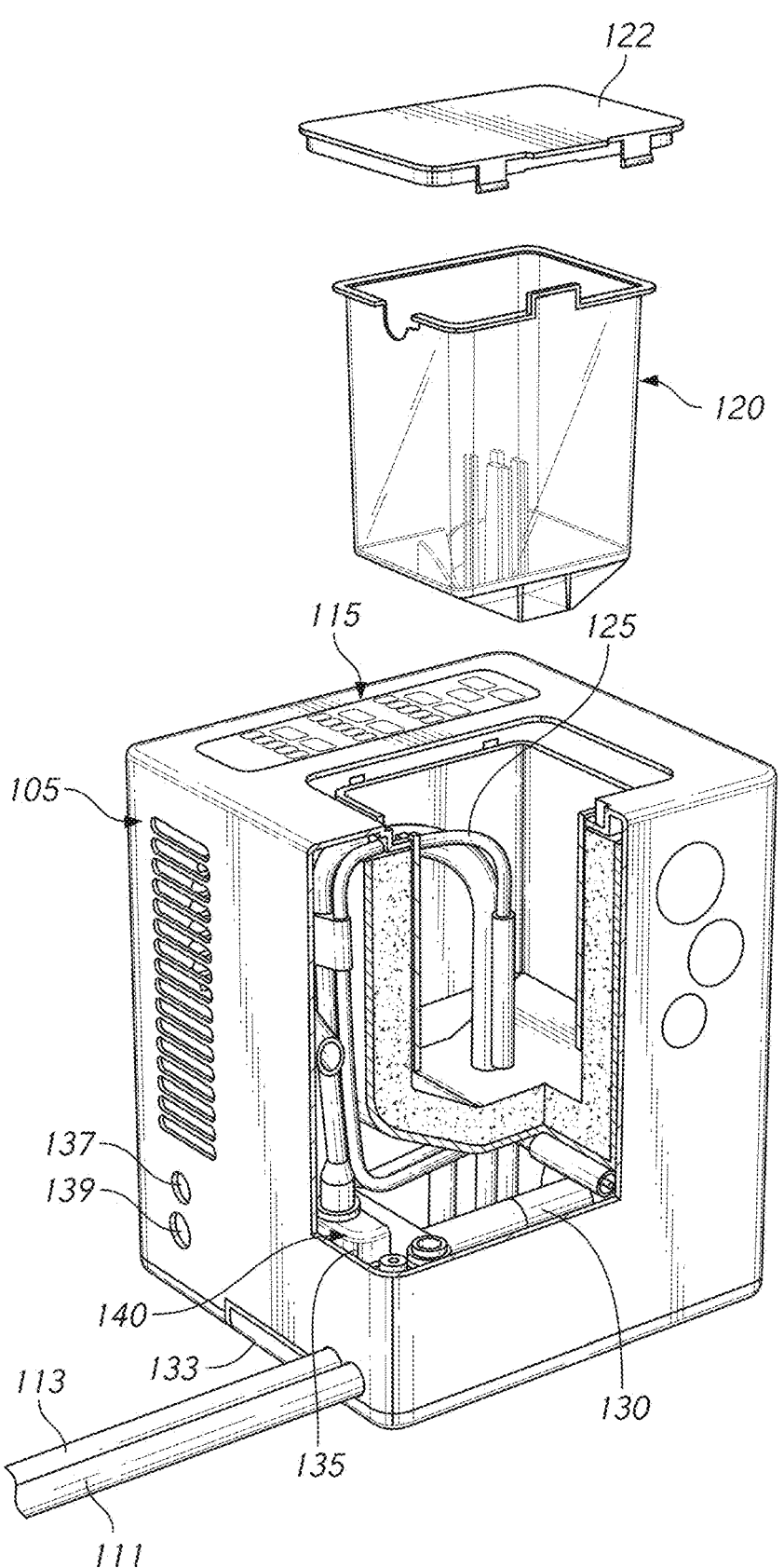
FIG. 2 is an exploded view of the system of FIG. 1, consistent with embodiments.

Referring now to FIGS. 1 and 2, an automated frozen food feeder system for aquatic environments (sometimes referred to herein as the "system 100") is shown according to an exemplary embodiment. In general, the system 100 includes a housing with an insulated chamber 112 (FIG. 2 shows a layer of insulation 108 housing the internal components for providing fish food, controlling the temperature of fish food, and for controlling the dispense and purging of fish food from lines. Some embodiments may include an internal drain system (not shown) that collects condensation that builds up within the insulated chamber and or leaks from one of the valve systems disclosed below. The drain system may be coupled to a removable drain drawer 133 that can be accessed from the housing's exterior to remove excess fluid.

Operation of the internal components may be performed via a user interface 115. In one embodiment, the user interface 115 is a membrane type touch panel positioned on one of the external surfaces of the housing. Details of the functionality accessed via the user interface 115 is discussed below in association with FIG. 8. Also visible from the external view of the housing is a vent 105 and an exhaust 110. Some embodiments include a 12V DC power input 139, which serves as the interface between the electrical components and the power supply. Some embodiments include a 0V-10V input port 137, which serves as an interface between a controller module 190 (FIG. 8) and third-party controllers capable of outputting a 0V-10V signal. In some embodiments, the controller module 190 may be Wi-Fi enabled and programmed to communicate with a software application controlled by a remote computing device (for example, a smart phone, mobile computing device, or desktop device). The controller module 190 interprets signals received through the 0V-10V input port 137 to output certain functions such as temperature change, feed cycles etc. The power supply converts AC power from the local power grid from 220/110V AC to a DC voltage and supplies the system 100 with for example, 12V-24V DC power (or a voltage level as needed).

Embodiments may generally include a removable reservoir 120 that stores the fish food (sometimes in slurry form) before being dispensed. An insulated lid 122 may cover the removable reservoir 120 to protect the contents therein. The reservoir 120 may include a mounting point for silicone tubing (food line 106) to draw food from the reservoir 120.

Figure 9:
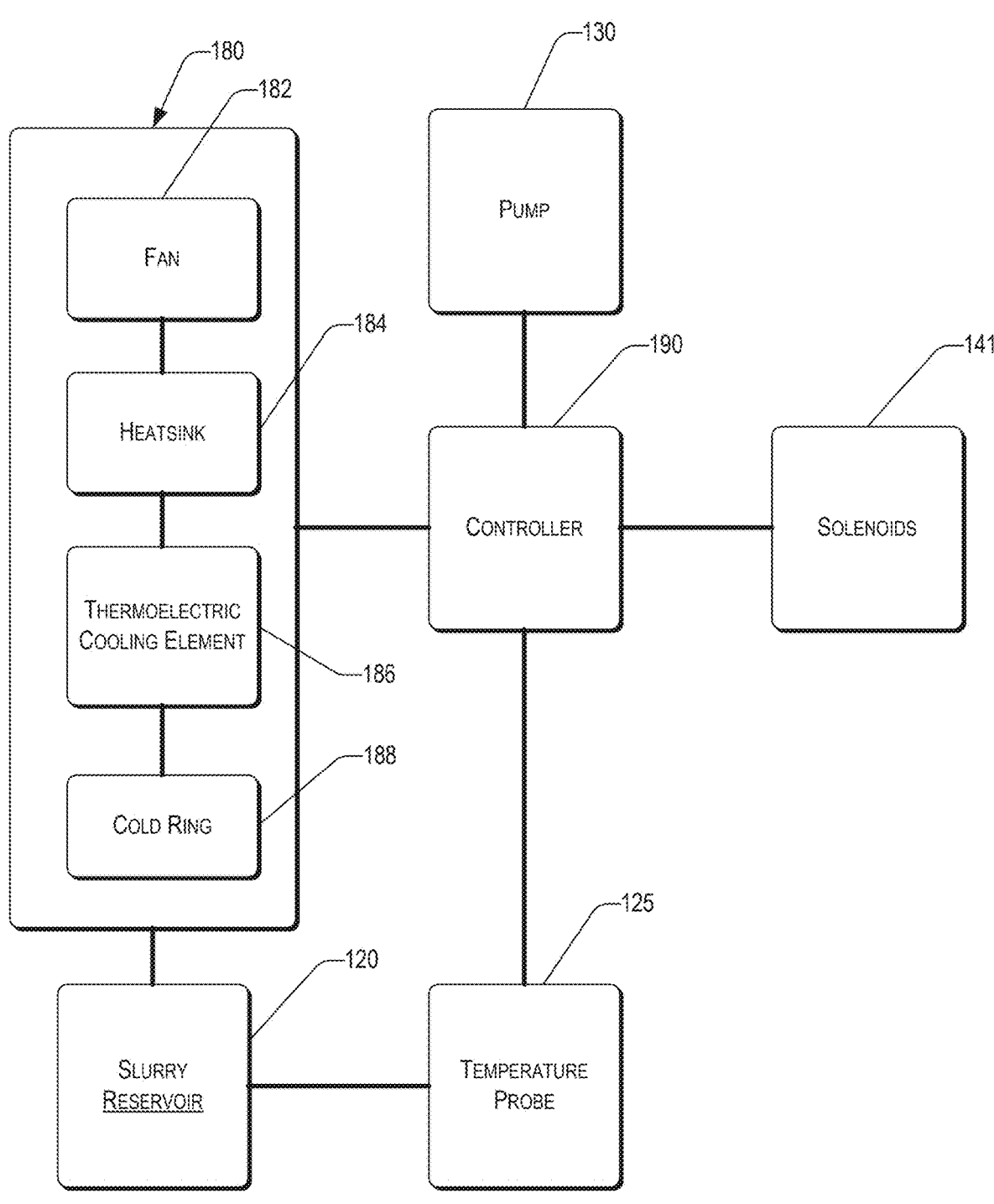
FIG. 9 is a block diagram of electrical connections in the system of FIG. 1, including a cooling system assembly, consistent with embodiments.

Referring also now to FIG. 9 with concurrent reference to FIGS. 1 and 2, a cooling system 180 is shown with electrical connections to other electrical elements in the system 100. The system 100 may include a temperature probe 125 that is disposed proximate the reservoir 120 when the reservoir 120 is situated for use within the insulated chamber 112. The cooling system 180 maintains the fish food in the reservoir 120 chilled in slurry form, sometimes at frozen temperatures. The cooling system 180 may include for example, a thermoelectric cooling element (TEC) 186 powered by 12 v DC, which cools one side of the TEC 186 and heats the other side. The TEC 186 is utilized to achieve the cold temperature required in the reservoir 120. Some embodiments include a cold contact plate or ring 188 positioned between the TEC 186 and the reservoir 120 (sometimes via direct contact or pressure with the reservoir 120). The cold contact plate 188 transfers cooling power from the TEC 186 to the reservoir 120. In some embodiments, a heatsink 184 is disposed proximate to the TEC 186 and cools the hot side of the TEC 186, maximizing efficiency on the cold side of the TEC 186. The heatsink 184 allows the system 100 to cool the reservoir 120 and helps draw heat to bring the reservoir 120 to the desired temperature. In some embodiments, a fan 182 may be attached to the heatsink 184 to draw the heat on the hot side of the heatsink 184 toward the exhaust 110. In some embodiments, the exhaust 110 is situated proximate the heatsink to directly draw heat out of the housing, so that a separate fan 182 is not needed. The exhaust 110 enhances the performance of the heatsink 184 and the TEC 186. The speed of the exhaust 110 may be controlled by the controller module 190 utilizing the desired temperature set on the user interface 115 and in some embodiments, may automatically operate to cool the reservoir 120 based on readings obtained from the temperature sensor 125 (as controlled via the controller module 190).

Figure 3:
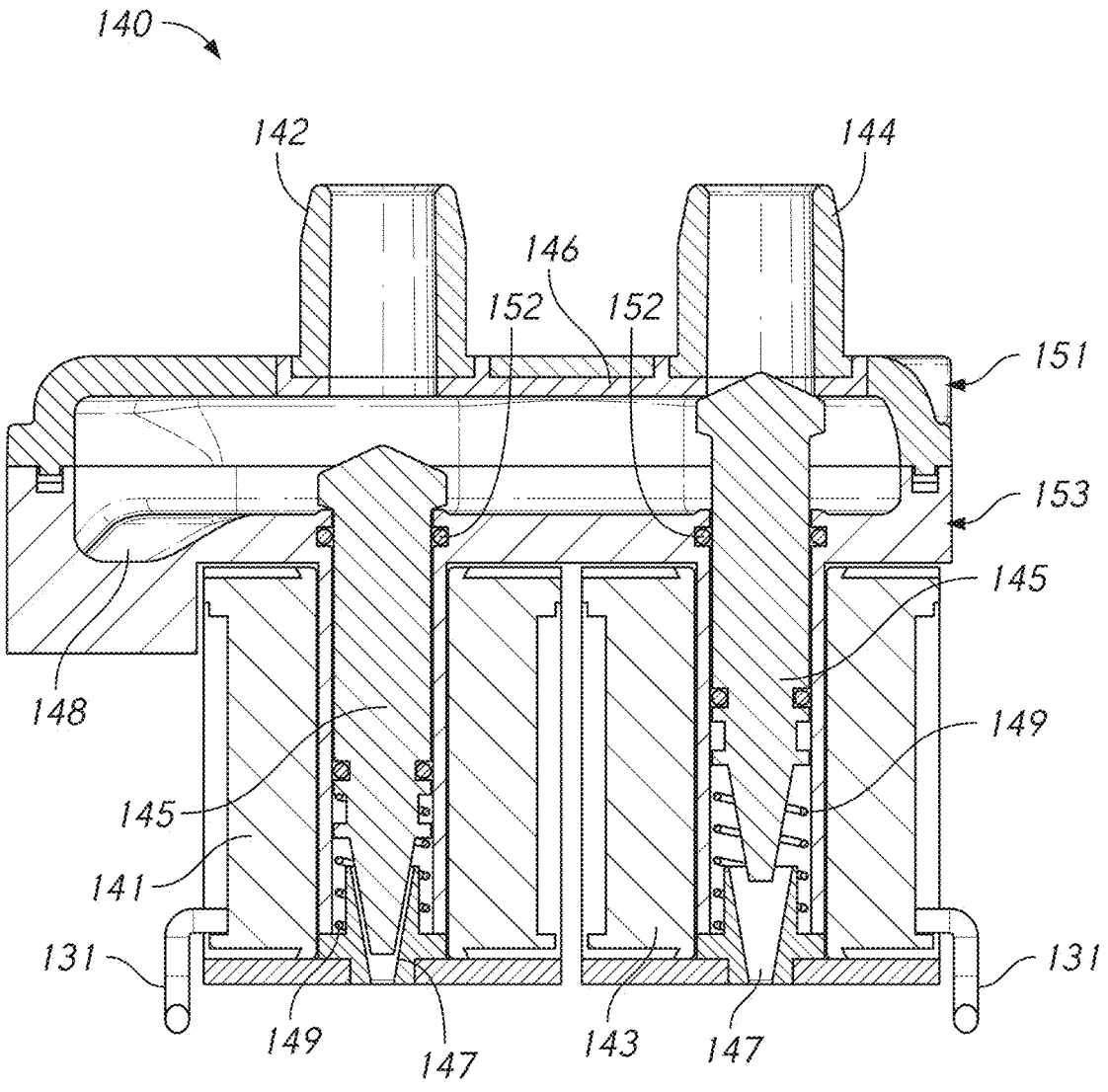
FIG. 3 is a cross-sectional side view of a manifold and solenoid valve system in the automated frozen food feeding system of FIG. 1 according to embodiments of the subject technology.

Referring back to FIG. 2, a manifold 135 may house a solenoid valve system 140. The solenoid valve system 140 may be coupled to a pump 130. The solenoid valve system 140 controls the flow of fish food and cleaning fluid through lines leading from the reservoir 120 and a fluid source (for example, a water supply). FIG. 3 shows an enlarged cross-sectional view of the manifold system 140. The interrelationship of elements in FIG. 3 should be referenced concurrently with their operation in FIG. 4. In one embodiment, the manifold system includes three ports: a food port 142, a fluid port 144, and a pump facing port 148. Tubing may connect to all three of the ports 142, 144, and 148 to deliver fish food or fluid therethrough. The manifold 135 may include an upper manifold body 151 and a lower manifold body 153. A seal 146 may be positioned in the upper manifold 151 preventing fluid from leaking around the ports 142 and 144.

Figure 7:
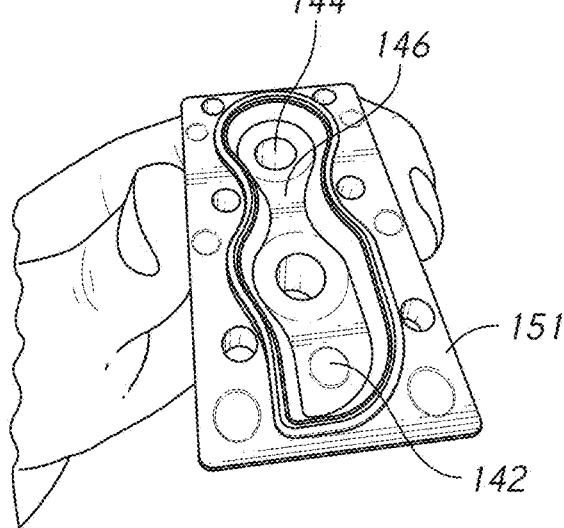
FIG. 7 is an isolated top view of a top portion of a manifold that covers the solenoid valve system of FIG. 3, consistent with embodiments.

An internal view of the upper manifold 151 and the seal positioning therein can be seen in FIG. 7. As will be shown better in FIG. 4, the food port 142 is disposed between the lines 106 and line 113 for transporting fish food from the reservoir 120 to an aquatic tank 150. The fluid port 144 is disposed along a path for circulating a cleaning fluid (including for example, water) back through fish food distribution lines to purge food particles from the food lines. The pump port 148 is disposed in communication with the food port 142 and the fluid port 144. In general, fluid may be sent in forward and reverse directions through the pump port 148 to either the food port 142 or the fluid port 144 and vice versa. Control of fluid or fish food through the manifold system 140 may be provided by the controller module 190.

In one embodiment, the controller module 190 operates a first solenoid 141 to move up and down which either exposes access to the food port 142 or seals access to the food port 142. The solenoid 141 may be coupled to a piston 145 whose body may include a head portion with a diameter greater than the body, The piston 145 may be inserted within a spring body 149 that is configured to bias the plunger 145 into a normally closed position blocking off the food port 142. The controller module 190 may control the solenoid 141 (through electrical lines 131) to energize an actuator 147 coupled to the spring body 149 to move the plunger 145 down and out of the path of the food port 142, or de-energize the actuator 147 and allow the spring body 149 to extend and push the plunger 145 back into the blocking position of the food port 142. An O-ring 152 may be positioned under the head portion to prevent food and fluid from leaking into the solenoid valve assembly 143. A second solenoid 141 and supporting elements may be positioned under the fluid port 144 controlling fluid flow through the fluid port 144.

The pump 130 may be controlled by the controller module 190. In one embodiment, the pump 130 is peristaltic, capable of pumping in forward and reverse directions. In general operation, the pump 130 pumps frozen food from the reservoir 120 into the aquarium 150 or to another desired food distribution location. Individual feed cycles are described below in detail. When the pump 130 operates in the forward direction, the food is pulled from the reservoir 120 through tubing line 106 through the food port 142 and out tubing line 117 to the pump port 148 to the pump 130. From the pump 130, the fish food is pushed through a tubing line 113 to the aquatic tank 150. When the pump 130 is operated in the reverse mode, water is pulled from a water source through tubing line 111. In some embodiments, the aquarium 150 can be used as the water source in a closed circuit system.

Feed Cycle 1

Figure 4:
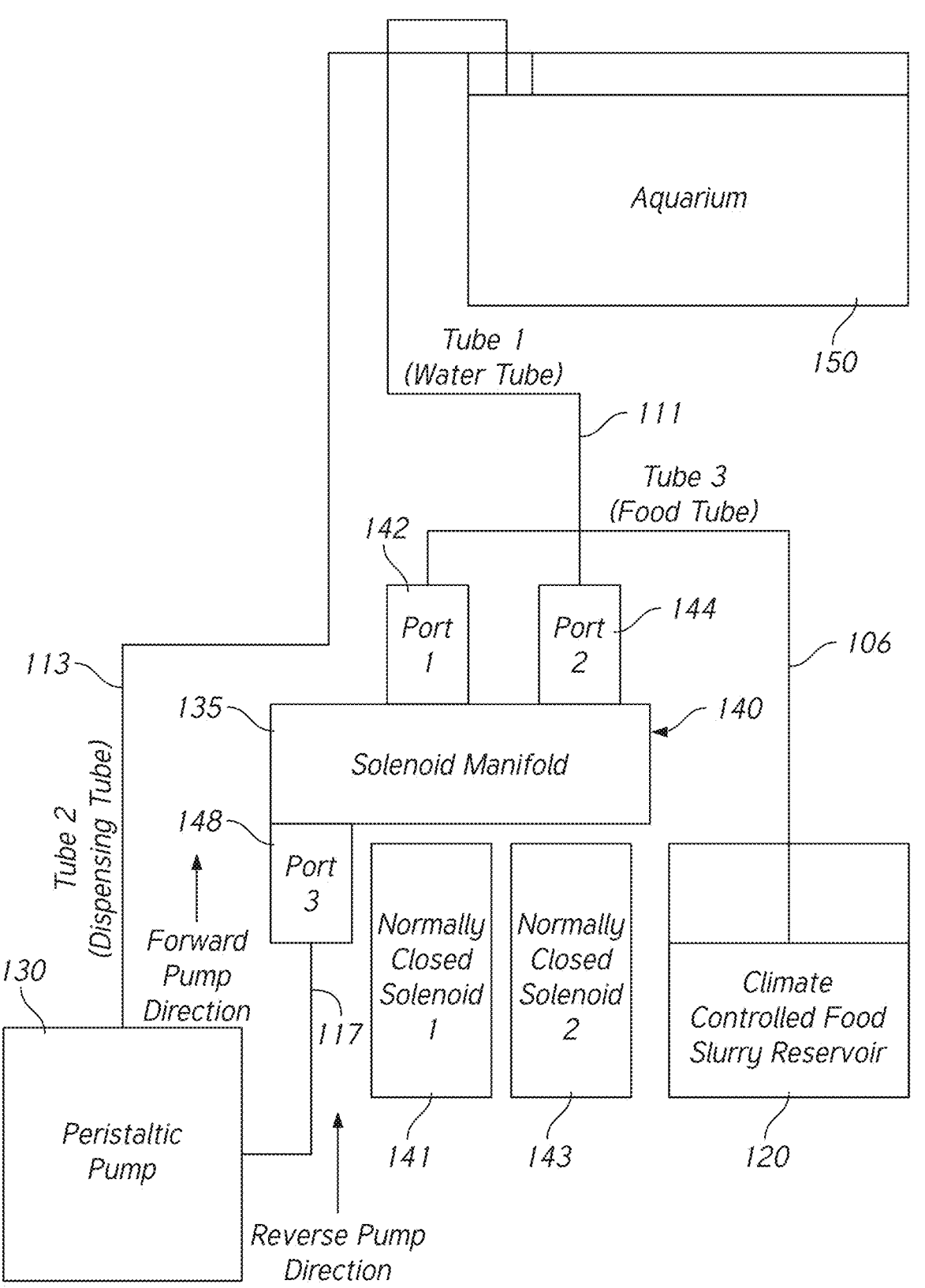
FIG. 4 is a diagrammatic view of a circulation system in the automated frozen food feeding system of FIG. 1 according to embodiments of the subject technology.

Referring still to FIG. 4, a feed cycle may be triggered via an internal timer, the "feed now" function 187 (See FIG. 8) button press, or via a command issued by a computing device (for example, a smart phone app) received by the controller module 190 through the 0V-10 v port 137. At default, both solenoids 141 may be closed. When triggered, the solenoid 141 associated with food port 142 energizes, opening food port 142. The pump 130 rotates in reverse, pumping for example, 2-4 mL into the reservoir 120. This process serves to disturb the slurry in the reservoir 120 which breaks up clogs formed at intake. The pump 130 rotates forward, drawing a user specified quantity of slurry past the piston 145 of port 142. The solenoid 141 is de-energized and returns to closed position.

Feed Cycle 2

At default, both solenoids 141 may be closed. The solenoid 141 associated with fluid port 144 may be energized, opening port 144. The pump 130 rotates forward, pushing food slurry pumped past food port 142. Water may be drawn from the aquarium 150 through line 111 into the aquarium 150 through the termination of line 113. The pump 130 pauses to allow food to distribute in aquarium 150.

Feed Cycle 3

At default, both solenoids 141 may be closed. The solenoid 141 associated with the fluid port 144 may be energized, opening fluid port 144. Water may be drawn through line 111, rinsing the solenoid(s) 141, pump 130 and line 113. The controller module 190 may control pumping of sufficient volume to clear full system (for example, 5 times). The solenoid 141 associated with the fluid port 144 may be de-energized closing fluid port 144. The solenoid 141 associated with food port 142 may be energized opening food port 142. The pump 130 runs in reverse for sufficient volume to clear line 106 of slurry. The purpose of this is to prevent spoiling of food in line 106, which is outside of the climate-controlled reservoir 120. The cycle may be completed.

Figure 5:
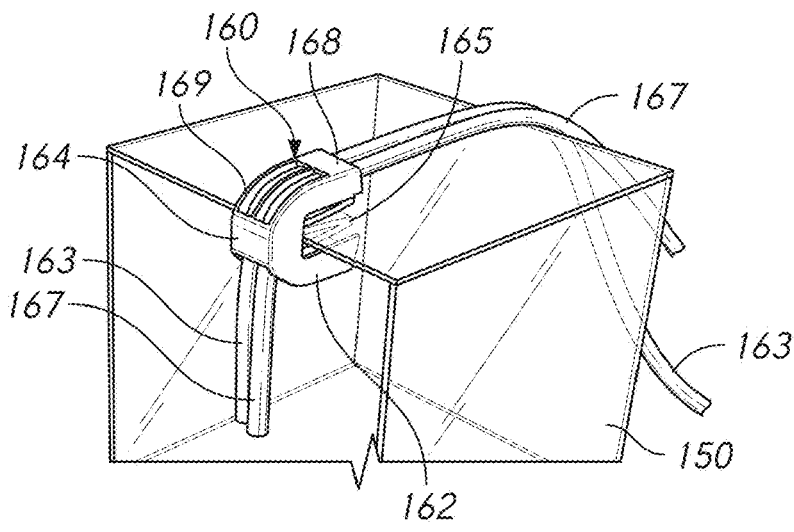
FIG. 5 is a partial view of a first orientation of a mount for lines in the automated frozen food feeding system of FIG. 1 according to embodiments of the subject technology.
Figure 6:
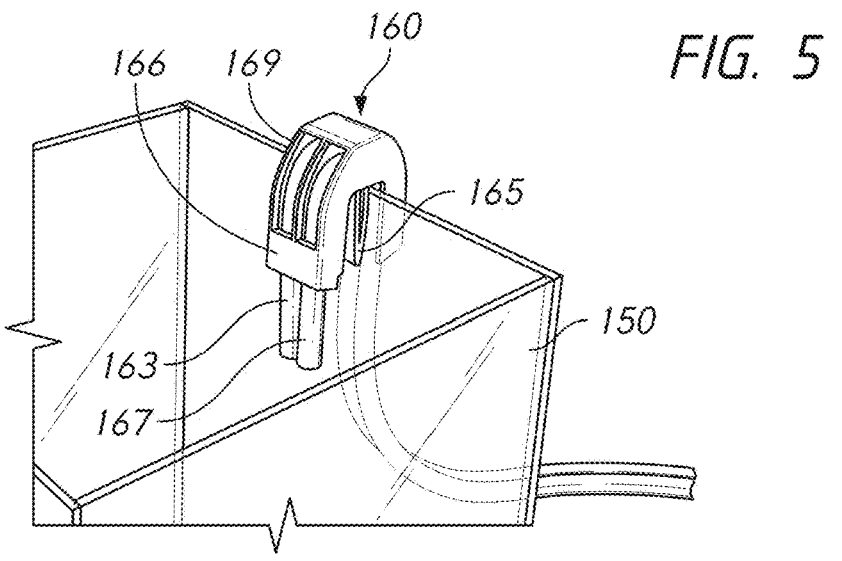
FIG. 6 is a partial view of a second orientation of a mount for lines in the automated frozen food feeding system of FIG. 1 according to embodiments of the subject technology.

FIGS. 5 and 6 show an example of a tubing mount 160. The mount 160 includes a housing 162 for carrying one or more tubes 163 and 167. In one embodiment, the housing 162 may have an open chassis 169 so that tubes 163 and 167 can be bent under guide rails 164, 166, and 168. The mount 160 may include a spring clamp 165 within the housing 162 that is configured to grasp onto an edge of the aquatic tank 150. In use, one may slide the edge of the aquatic tank 150 onto the edge of the tank and slide the mount 160 down until secure. FIG. 5 illustrates a mounting configuration that is compatible with tanks that have horizontal bracing at the top of the tank (sometimes referred to as "Euro bracing") or for tanks without bracing. FIG. 6 illustrates mounting on the top edge of a tank with an opening facing upward.

Figure 8:
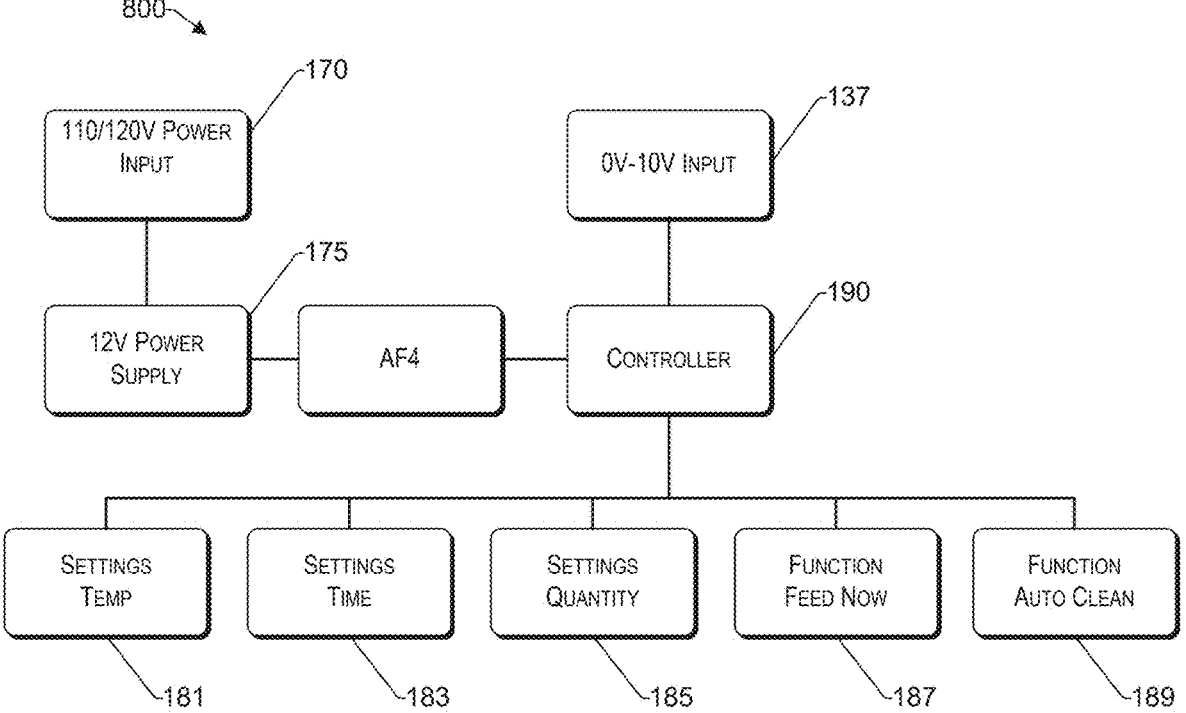
FIG. 8 is a block diagram of an automated frozen food feeding system according to embodiments of the subject technology.

FIG. 8 shows an electrical architecture 800 of connections for the electrical components and settings available that are controlled by the controller module 190. The controller module 190 is connected directly or indirectly to power sources (0V-10V input 137, 110/120V power input 170, and power supply 175). The controller module 190 may trigger operation of a plurality of settings and functions that are received via input from actuation of buttons in the user interface 115. For example, the controller module 190 may adjust the temperature inside the insulated chamber 112 by controlling operation of the thermoelectric cooling chip via user input into a setting for temperature function 181. The controller module 190 may set a clock and may control timing functions related to a schedule for dispense of food, an amount of time associated with the dispense of food, and a schedule for purging the lines, all via user input into the time setting function 183. The controller module 190 may control how much food is dispensed by controlling the pump 130 and the solenoid 141 associated with the food port 142 via user input into the setting function for quantity 185. A feed now function button 187 may trigger the controller module 190 to immediately actuate pump 130 and the solenoid 141 associated with the food port 142 to dispense food. An auto-clean function 189 may trigger the controller module 190 to schedule activation of the pump 130 and the solenoid 141 associated with the fluid port 144 to purge the lines with water or similar after food is dispensed. In operation, the auto-clean function provides a maintenance function. Cleaning tablets may be used in conjunction with this process. In short, the auto-clean function actuates the solenoids 141 multiple times to ensure they are clear, then runs several forward and reverse cycles to make sure the entire unit is clean and if used in conjunction with the cleaning tablets, that all parts of the system are disinfected.

In one embodiment of the self-cleaning function, the system 100 is removed from the aquarium, and the tubing is oriented so that the unit recycles cleaning solution from a cleaning tablet. A series of pump cycles move the solution through the unit. A second cycle is run with the "feed tube" (for example, line 106) located in a drain or bucket to flush all cleaning solution from the system 100.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for automated dispensing of fish food into an aquatic holding tank and purging of lines, comprising:
  a reservoir for holding the fish food until a time for feeding is reached;
  a food line connecting the reservoir to the aquatic holding tank;
  a pump system, wherein the pump system is connected between the reservoir and the aquatic holding tank and configured to move the fish food from the reservoir to the aquatic holding tank;
  a cooling system coupled to the reservoir and disposed to cool the fish food; and
  a controller module connected to the pump system and to the cooling system, wherein the controller module is programmed to control:
  a temperature of the cooling system that maintains the fish food in a slurry between 1.0° C. and −1.8° C. while in the reservoir,
  operation of the pump system to move fish food from the reservoir to the aquatic holding tank through the food line according to a programmed time schedule and interval of feeding, wherein the operation of the pump system includes a three-cycle feeding process comprising:
    a first cycle where the pump operates in reverse and a first solenoid is controlled to allow fluid to disturb the slurry in the reservoir;
    a second cycle where the pump operates in a forward direction with the first solenoid and a second solenoid controlled to deliver the slurry from the reservoir to the aquatic holding tank; and
    a third cycle where the first solenoid and the second solenoid are closed and the pump is operated drawing fluid through the food line, and
  purging food from the food line connected to the reservoir.

2. The system of claim 1, wherein the pump is a peristaltic pump configured to operate in a forward and reverse mode.

3. The system of claim 1, further comprising a user interface connected to the controller module, wherein the user interface includes controls for user controlled settings administered by the controller module.

4. The system of claim 3, wherein the settings include a user set temperature of the cooling system.

5. The system of claim 3, wherein the settings include a user set interval schedule controlling a dispense of the fish food into the aquatic holding tank.

6. The system of claim 3, wherein the settings include a user set controlled quantity of fish food to be dispensed into the aquatic holding tank.

7. The system of claim 3, wherein the user interface further comprises a button that controls the controller module to immediately dispense the fish food.

8. The system of claim 3, wherein the user interface further comprises a button that controls the controller module to immediately purge one or more lines connected to the pump and/or reservoir.

9. The system of claim 1, further comprising a 0V-10V input port connected to the controller module for receiving commands from third party hardware.

10. The system of claim 1, wherein the cooling system includes a thermoelectric cooling element.

11. The system of claim 1, further comprising a first solenoid valve positioned between the pump and the food line, wherein the first solenoid is configured to control a force from the pump moving the fish food through the food line.

12. The system of claim 11, the first solenoid valve includes a first core body and a first plunger head, wherein the first plunger head has a diameter that is greater than a diameter of a food port leading to the food line.

13. The system of claim 12, further comprising:
a water port connected to a water source and positioned in communication with the food port; and
a second solenoid valve positioned between the water port and the food port, wherein the second solenoid valve is configured to control a fluid flow of water into the food line to controllably purge the food line.

14. The system of claim 13, further comprising an insulated compartment housing the reservoir.

15. The system of claim 14, further comprising:
a drain coupled to the insulated compartment; and
a drawer coupled to the drain, disposed to collect condensation from the insulated chamber and/or leakage from the first solenoid valve and/or second solenoid valve.

16. The system of claim 1, wherein the controller module is configured to operate the pump based on commands received from a wireless computing device and software application.

* * * * *